United States Patent Office 3,134,745
Patented May 26, 1964

3,134,745
POLYMERIC POLYOLS AND METHOD OF
MAKING THE SAME
Kent S. Dennis, Midland, Mich., assignor to The Dow
Chemical Company, Midland, Mich., a corporation of
Delaware
No Drawing. Filed Apr. 26, 1961, Ser. No. 105,556
20 Claims. (Cl. 260—45.5)

This invention concerns new polymeric polyols and pertains to a method of making the same. It relates more particularly to polyols derived from polymers of one or more ethylenically unsaturated hydrocarbon monomers having conjugated unsaturation at least one of which double bonds is between carbon atoms of an aliphatic portion of the hydrocarbon monomer, and pertains to a method for making such polymeric polyols.

It is known to polymerize an unsaturated hydrocarbon having conjugated double bonds, at least one of which double bonds occurs in an aliphatic radical, by treating the unsaturated hydrocarbon with an addition compound of an alkali metal and a polycyclic aromatic hydrocarbon, e.g. the addition compound of sodium and naphthalene. The addition compounds of an alkali metal with a variety of aromatic compounds such as naphthalene, anthracene, stilbene and alpha-methyl styrene are also known to be catalysts for the polymerization of unsaturated hydrocarbons having conjugated double bonds such as styrene or butadiene. The polymerization of the unsaturated hydrocarbons in admixture with alkali metal addition compounds as catalyst is generally carried out in an ether solvent and reaction medium such as dimethyl ether of tetraethylene glycol, methyl ethyl ether, dimethyl ether, methyl normal propyl ether, methyl isopropyl ether, methyl ethyl ether of tetraethylene glycol, trimethylene glycol dimethyl ether, glycerol trimethyl ether, dioxane, tetrahydrofuran and the like, which ethers are free from groups such as hydroxyl, carboxyl, and halogen atoms which are reactive towards alkali metals.

The hydrocarbon polymers prepared in an ether solvent with an alkali metal addition compound as polymerization catalyst and with reasonable care to keep the reactants and reaction mixture free from air, oxygen, carbon dioxide, water or water vapor, or other materials which inhibit or kill the polymerization reaction are known to be reactive or "living" polymers, i.e. they are capable of reacting with further quantities of monomer to form larger polymer molecules or of reacting with other groups or compounds, such as oxygen, water, carbon dioxide or epoxy groups to terminate growth of the polymer chain.

In accordance with the invention the new polymeric polyols can readily be obtained in good yield by polymerizing one or more unsaturated hydrocarbons having conjugated double bonds, at least one of which double bonds occurs in an aliphatic radical, in an ether solvent and reaction medium, which is free from groups reactive with alkali metals, in admixture with an alkali metal addition compound of alpha-methyl styrene, reacting the thus-formed hydrocarbon polymer in the ether solvent in which it is prepared with a polyfunctional epoxy-containing coupling agent in amount as hereinafter specified, whereby at least a portion of the hydrocarbon polymer molecules are chemically combined into polymer molecules of larger size, then reacting the polymeric material with a monofunctional epoxide, e.g. ethylene oxide.

The product or polymeric polyol is recovered in usual ways such as by neutralizing or acidifying the ether reaction mixture, filtering the same to remove insoluble material such as salts which may be formed as by-products in the reaction and evaporating the solvent, preferably under reduced pressure such as in a vacuum oven, to leave the polymeric polyol as residue.

The hydrocarbon monomers having conjugated double bonds at least one of which double bonds occurs in an aliphatic radical or portion of the monomer molecule, to be employed in making the polymer starting material can be a monoalkenyl aromatic hydrocarbon having the general formula:

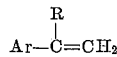

wherein Ar represents an aromatic hydrocarbon of the benzene series and R is hydrogen or the methyl radical, or an aliphatic conjugated diolefin having the general formula:

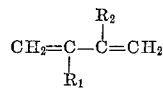

wherein $R_1$ and $R_2$ each represent a member of the group consisting of hydrogen and the methyl radical.

Examples of suitable alkenyl aromatic hydrocarbons are styrene, vinyltoluene, vinylxylene, ethylvinylbenzene, isopropylstyrene, tert.-butylstyrene, ethylvinyltoluene, sec-butylstyrene, alpha-methyl styrene, and para-methyl alpha-methyl styrene. Examples of suitable aliphatic conjugated diolefins are butadiene, isoprene and dimethylbutadiene. Mixtures of any two or more of the unsaturated hydrocarbon monomers can be used.

It is important in preparing the hydrocarbon polymer starting material in an ether solvent and reaction medium that the polymerization reaction be carried out in admixture with an alkali metal addition compound of alpha-methylstyrene as the polymerization catalyst in order to obtain the polymeric polyols in accordance with the invention.

The alkali metal addition compounds of alpha-methyl styrene can be prepared by procedure described in U.S. application Serial No. 756,072, filed August 20, 1958, by Robert L. Zimmermann, or as described in J. Organic Chemistry, vol. 18, pages 447–463 (1953), by A. G. Brook et al.

The proportion of the alkali metal addition compound of alpha-methyl styrene to be employed in the polymerization reaction will vary depending upon the amount of the hydrocarbon monomer to be polymerized and the molecular weight of the polymeric starting material that is desired. The molecular weight of the polymer is directly proportional to the ratio of the alkali metal addition compound and the moles of hydrocarbon monomer employed. The proportion of the alkali metal addition compound to be employed in the polymerization reaction to obtain a starting polymer having a desired molecular weight can readily be determined from the equation:

$$\text{Mol. wt.} = \frac{2ZX}{Y}$$

wherein X is the gram moles of hydrocarbon monomer, Y is the gram atomic equivalents of alkali metal in the alpha-methyl styrene addition compound used, and Z is the gram molecular weight of the monomer. In general, an amount of the alkali metal addition compound of alpha-methyl styrene corresponding to from 400 to 40 milliequivalents of alkali metal in the addition compound results in the formation of a hydrocarbon polymer having an average molecular weight of from about 1,000 to 10,000, respectively, when employing two gram molecular proportions of the hydrocarbon monomer styrene as starting material.

The polymerization can be carried out at reaction temperatures between about 30° and −78° C., preferably at from −50° to about 0° C., and at atmospheric or substantially atmospheric pressure, although superatmospheric or subatmospheric pressures can be used.

It may be mentioned that when the hydrocarbon monomer is alpha-methyl styrene there is a temperature, which is dependent upon the concentration of the monomeric alpha-methyl styrene in the reaction mixture, above which polymerization of the alpha-methyl styrene does not proceed. Such temperature is called the "ceiling temperature." A method of determining the ceiling temperature for alpha-methyl styrene in tetrahydrofuran is described in J. Polymer Science, Vol. 25, pages 488–490, September 1957, and is defined by the equation:

$$\frac{1}{T_c} = 0.00358 - 0.000661 \log [m]$$

wherein $T_c$ is the absolute temperature in degrees Kelvin and $m$ is the concentration of the alpha-methyl styrene in gram moles per liter of the ether solvent and reaction medium.

As previously mentioned the polymerization of the hydrocarbon monomer is carried out in an ether solvent and reaction medium such as dimethyl ether of tetraethylene glycol, methyl ethyl ether, dimethyl ether, methyl normal propyl ether, methyl isopropyl ether, methyl ethyl ether of tetraethylene glycol, trimethylene glycol dimethyl ether, glycerol trimethyl ether, dioxane or tetrahydrofuran, which ethers are free from groups such as hydroxyl, caboxyl and halogen atoms which react with alkali metals. Ethers such as tetrahydrofuran and alkyl ethers of the formula $CH_3$—O—R wherein R is alkyl are preferred. The reaction is carried out in the absence or substantial absence of air, oxygen, carbon dioxide, water or water vapor or other materials which kill or terminate the polymerization reaction. It is necessary of course, that the hydrocarbon monomers be of high purity and free from materials which kill or terminate the polymerization reaction.

The invention contemplates preparing a hydrocarbon polymer of a desired molecular weight in an ether solvent and reaction medium in the presence of an alkali metal addition compound of alpha-methyl styrene as the polymerization catalyst, or of starting with an ether solvent solution of such reactive hydrocarbon polymer, and reacting the hydrocarbon polymer in the solution in which it is prepared with a polyfunctional epoxy-containing compound which is a coupling agent to react with the hydrocarbon polymer molecules, whereby at least a portion of the hydrocarbon polymer molecules are chemically combined with the coupling agent and/or with other polymer molecules to form polymer molecules of larger size.

The polyfunctional epoxy-containing coupling agent can be a compound having at least two groups or atoms which are reactive with the polymer such as epichlorohydrin, butadiene oxide, diglycidyl ethers of diols, diglycidyl ethers of dihydroxy benzenes, diglycidyl ethers of diphenols, and polyglycidyl ethers of polyols. Examples of suitable poly-functional epoxy-containing compounds are epichlorohydrin, butadiene dioxide, diglycidyl ether of resorcinol, diglycidyl ether of 4,4'-isopropylidene diphenol, vinyl cyclohexene dioxide, diglycidyl ethers of glycols having the general formula:

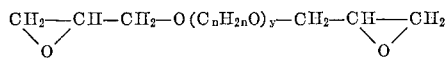

wherein $n$ is a whole number from 2 to 3 and $x$ is an integer from 1 to 4, diglycidyl ether of 1,3-propane diol, diglycidyl ether of 1,4-butane diol, triglycidyl ether of glycerol, and di-, tri-, and tetra-glycidyl ethers of pentaerythritol.

The polyfunctional epoxy-containing compound is preferably employed in amount corresponding to from about 0.25 to 0.75 chemically equivalent proportion of the polyfunctional compound per gram molecular proportions of the hydrocarbon polymer starting material, although it can be used in amounts of up to approximately one gram molecular proportion per gram molecule of the hydrocarbon polymer, when cross-linking between polymer molecules is not desired.

After reacting the hydrocarbon polymer with the polyfunctional epoxy-containing coupling agent, whereby at least a portion of the hydrocarbon polymer molecules have been joined together by chemical bonds between the coupling agent and reactive carbon atoms in the hydrocarbon polymer chain to form polymer molecules of larger size, the resulting polymeric material is reacted with a mono-functional epoxy-containing compound such as an alkylene oxide or a substituted alkylene oxide such as ethylene oxide, 1,2-propylene oxide, 1,2-butylene oxide, isobutylene oxide or styrene oxide, while the material is dissolved in the ether solvent, whereby the remaining reactive carbon atoms on the hydrocarbon polymer chains are killed or terminated by reaction with the epoxide to form hydroxyl groups in the polymer molecule.

It may be mentioned that the polymerization of hydrocarbon monomer to form polymers in an ether solvent in admixture with an alkali metal addition compound of alpha-methyl styrene as polymerization catalyst is characterized by the solution of the alkali metal addition compound being a bright red to red brown color which colors the reaction mixture. This color provides a ready means of following the course of the reaction in that disappearance of the color indicates termination of the reaction and the killing off of the reactive carbon atoms on the chains of the polymer molecules.

In practice, an ether solvent and reaction medium, e.g. tetrahydrofuran, preferably freshly distilled, is placed in a clean suitable reaction vessel filled with nitrogen gas to exclude air or oxygen, and equipped with a stirrer and suitable heating or cooling means such as a reflux condenser, or internal coils or outer jackets, through which a heat transfer medium is circulated. The ether solvent is stirred and a quantity of a solution of an alkali metal addition compound of alpha-methyl styrene in an ether solvent is added slowly until the mixture is a pink to faint red color. The appearance of the color indicates that impurities in the ether solvent which may inhibit polymerization of the hydrocarbon monomer have been removed or immobilized by reaction with the alkali metal addition compound. Thereafter, a quantity of the solution of the alkali metal addition compound of alpha-methyl styrene is added to the solvent in amount as desired and determined by the equation:

$$\text{Mol. wt.} = \frac{2ZX}{Y}$$

wherein X is the gram moles of hydrocarbon monomer to be polymerized, Y is the gram atomic equivalents of alkali metal in the alpha-methyl styrene addition compound used as polymerization catalyst and Z is the gram molecular weight of the hydrocarbon monomer used. The mixture of the ether solvent is stirred and maintained at a desired polymerization temperature within the range of from about −80° to +30° C. Thereafter, the hydrocarbon monomer, e.g. styrene, vinyltoluene, alpha-methylstyrene, butadiene, isoprene, dimethylbutadiene, and the like, preferably in admixture with the ether solvent, is added to the stirred mixture of the ether solvent and the alkali metal addition compound of alpha-methyl styrene at about the rate it is consumed in the polymerization reaction or at a rate which permits control of the reaction without exothermic runaway. After the addition and polymerization of the hydrocarbon monomer, there is added to the ether solution of a polymer, a polyfunctional epoxy-containing compound as coupling agent such as epichlorohydrin, butadiene dioxide, diglycidyl ether of 4,4'-isopropylidene diphenol, or diglycidyl ether of ethylene glycol and the like, in amount, preferably corresponding to from about 0.25 to 0.75 chemically equivalent proportions of the difunctional epoxy-containing compound per gram molecular proportion of the hydrocarbon polymer, to chemically combine at least a portion of the hydrocarbon polymer molecules into larger polymer molecules by reaction with the polyfunctional epoxy-containing coupling agent. Thereafter, there is added to the mixture a monoepoxy compound such as an alkylene oxide or a substituted alkylene oxide such as ethylene oxide, propylene oxide, butylene oxide, isobutylene oxide or styrene oxide, in amount sufficient to react with the remaining reactive carbon atoms in the hydrocarbon polymer chains, thereby terminating the polymer chains with hydroxyl groups and forming the polymeric polyols of the invention. The proportion of the monoepoxy compound to be employed is readily determined by the disappearing of the characteristic red color of the reaction mixture, and is usually within the range of from 0.25 to 0.75 gram molecular proportion of the monoepoxy compound per gram molecular proportion of the polymer starting material, depending upon the proportion of polyfunctional epoxy-containing coupling agent used. The product is recovered by neutralizing the reaction mixture with an acid or making it slightly acidic, filtering the mixture to remove insoluble material and evaporating the solvent from the filtrate, preferably under reduced pressure to obtain the polymeric product as residue.

The following examples illustrate ways in which the principle of the invention has been applied, but are not to be construed as limiting its scope.

*Example 1*

(A) An alkali metal addition compound of alpha-methyl styrene was prepared by placing 130 ml. of alpha-methyl styrene in a glass reaction vessel equipped with a reflux condenser and stirrer, and filled with nitrogen gas, and adding thereto 370 ml. of freshly distilled tetrahydrofuran as solvent and reaction medium. The mixture was stirred and maintained under an atmosphere of nitrogen gas while adding dropwise a charge of 35 grams of a liquid alkali metal alloy, prepared by heating together 21 grams of sodium metal and 14 grams of potassium metal. The resulting solution was stirred and maintained at room temperature for a period of 5 hours, then was allowed to stand overnight, under nitrogen gas at atmospheric pressure. The normality of the solution was determined by titrating an aliquot portion of the same with n-butyl alcohol and calculating the concentration of the alkali metal addition compound therein. The solution was found to contain the alkali metal alpha-methyl styrene addition compound in amount corresponding to a 1.24 normal solution. The solution was employed as the polymerization catalyst in the second part of this example.

(B) A charge of 100 ml. of tetrahydrofuran as reaction medium was placed in a glass reaction vessel filled with nitrogen gas and equipped with a stirrer. It was stirred and maintained at room temperature while adding a few drops of the solution of the alkali metal-alpha-methyl styrene addition compound, prepared in part A above, thereto to bring the resulting mixture to a pale red color, the appearance of the red color indicating that impurities which were present in the tetrahydrofuran reaction medium were removed or immobiized by reaction with the alkali metal addition compound. Thereafter 219 ml. more of the solution of the alkali metal addition compound was added as polymerization catalyst. The resulting solution of tetrahydrofuran solvent and reaction medium containing the alkali metal addition compound as polymerization catalyst was stirred and maintained at a temperature of about 25° C. while adding thereto a feed mixture consisting of 250 ml. of styrene monomer and 250 ml. of tetrahydrofuran as solvent. The feed mixture was added over a period of 1.25 hours. The styrene was polymerized to a polymer having a molecular weight of approximately 2000. To the solution of the polymer there was added 5.32 ml. of epichlorohydrin, dropwise with stirring. Thereafter, ethylene oxide was bubbled into the solution until the red color thereof disappeared. A charge of 21 ml. of concentrated aqueous hydrochloric acid solution was added. The resulting mixture was filtered to remove insoluble material. The filtrate was evaporated to dryness in a vacuum oven to recover the polymeric product. There was obtained 280 grams of a white brittle polymeric product having a hydroxyl number of 45. The product was a polymer having a molecular weight of approximately 4400 and the empirical formula:

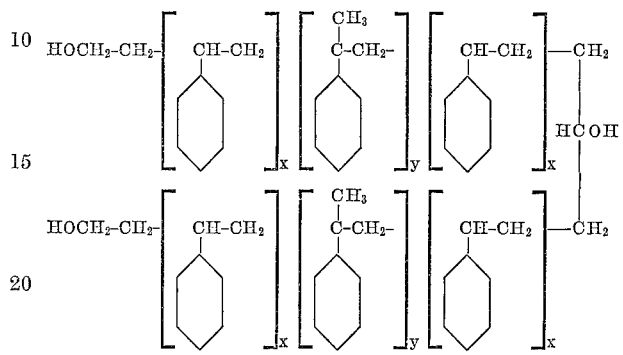

wherein $x$ is an integer of about 8 and $y$ is an integer from 2 to 6.

The product was a polymeric polyol useful for a variety of purposes such as making polyesters by reaction with polybasic acids or anhydrides or for making urethane polymers by reaction with diisocyanates e.g. tolylene diisocyanate.

*Example 2*

Polystyrene having a molecular weight of about 2000 was prepared by procedure similar to that employed in part B of Example 1 by adding a mixture of styrene and tetrahydrofuran to a solution of the alkali metal-alpha-methyl styrene addition compound catalyst in tetrahydrofuran as prepared in part A of Example 1. To the solution of the reactive polystyrene of molecular weight of about 2000, there was added 22.5 ml. of diglycidyl ether of 4,4'-isopropylidene diphenol of the formula

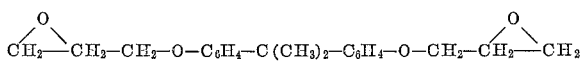

The product was recovered by evaporating the tetrahydrofuran in a vacuum oven. The product was a polymeric polyol having a hydroxyl number of 49 and a molecular weight of approximately 4700.

*Example 3*

A charge of 236 ml. of a 1.112 normal solution of an alkali metal-alpha-methyl styrene addition compound prepared by procedure similar to that described in part A of Example 1 was placed in a glass reaction vessel as polymerization catalyst. A monomer feed mixture was prepared by dissolving butadiene in 520 ml. of tetrahydrofuran maintained at a temperature of about 4° C. until the liquid volume was 750 ml. A charge of 700 ml. of the butadiene feed mixture was added over a period of 1.5 hours to the solution of the alkali metal-alpha-methyl styrene addition compound in the reaction vessel while maintaining the resulting mixture at temperatures between −35° and −40° C. to polymerize the butadiene to a polymer having a molecular weight of approximately 1550. Thereafter, 6.36 ml. of epichlorohydrin were added dropwise with stirring, and was followed by the addition of ethylene oxide until the red color of the mixture disappeared. A charge of 30 ml. of aqueous concentrated hydrochloric acid solution was added, after which the mixture was allowed to warm to room temperature, and was filtered to remove insoluble material. The polmeric product was recovered by evaporating the tetrahydrofuran solvent in a vacuum oven. There was obtained 154 grams of a viscous yellow syrup having a molecular weight of approximately 3200 and a hydroxyl number of 56.

Example 4

A monomer feed mixture consisting of 95 ml. of freshly distilled alpha-methyl-styrene, 597 ml. of tetrahydrofuran solvent and 308 ml. of butadiene was prepared and maintained at a temperature of about −20° C. A charge of 300 ml. of tetrahydrofuran as solvent and reaction medium was placed in a glass reaction flask filled with nitrogen gas and equipped with a stirrer, and an amount of a 1.071 normal solution of sodium-potassium addition compound of alphamethyl styrene in tetrahydrofuran, prepared by procedure similar to that employed in part A of Example 1, was added to bring the mixture to a faint red color. Thereafter, 375 ml. more of the 1.071 normal solution of the sodium-potassium alpha-methyl styrene addition compound was added as polymerization catalyst and the reaction flask and contents were cooled to a temperature of −30° C. The solution was stirred and maintained at −30° C. while adding dropwise a charge of 950 ml. of the monomer feed mixture over a period of 80 minutes. The monomer was copolymerized to form a copolymer of butadiene and alphamethyl styrene having an average molecular weight of approximately 1900. To the solution of the reactive copolymer at −30° C., there was slowly added 7.88 ml. of epichlorohydrin, followed by the addition of ethylene oxide until the red color of the solution in the reaction vessel disappeared. Thereafter, 100 ml. of an aqueous concentrated hydrochloric acid solution was added and the resulting mixture was allowed to warm up to room temperature. The reaction mixture was filtered to remove insoluble material. The filtrate was evaporated to dryness in a vacuum oven to recover the polymeric product as residue. There was obtained 365 grams of a brittle, polymeric material having a hydroxyl number of 43. The product was a polymeric polyol having a molecular weight of approximately 4000. It is useful as a starting material for making polyesters and polyurethane resins.

Example 5

A monomer feed mixture consisting of 97 ml. of a mixture of approximately 65 percent by weight of meta-vinyl-toluene and 35 percent of para-vinyltoluene, 595 ml. of tetra-hydrofuran as solvent and reaction medium and 308 ml. of butadiene was polymerized in admixture with 335 ml. of a 1.201 normal solution of a sodium-potassium alpha-methyl styrene addition compound in tetrahydrofuran, employing procedure similar to that employed in Example 4, except that the polymerization was carried out at temperatures between −35° and −40° C., to form a copolymer of the vinyltoluene and the butadiene having an average molecular weight of approximately 2000. To the solution of the reactive copolymer at temperatures of from −35° to −40° C., there was slowly added 7.89 ml. of epichlorohydrin with stirring after which ethylene oxide was bubbled into the solution until the red color disappeared. A charge of 100 ml. of aqueous concentrated hydrochloric acid solution was added. The solution was allowed to warm up to room temperature, and was filtered to remove insoluble material. The filtrate was evaporated to dryness to recover the polymeric product. There was obtained 369 grams of a brittle solid product having a hydroxyl number of 62. The product was a polymeric polyol having a molecular weight of approximately 4200. It is useful as a starting material for making polyesters and polyurethane resins.

Example 6

A feed mixture of 308 ml. of butadiene dissolved in 692 ml. of tetrahydrofuran as solvent and reaction medium was polymerized in admixture with 407 ml. of a 1.156 normal solution of a sodium-potassium alpha-methyl styrene addition compound in tetrahydrofuran at temperatures between −35° and −40° C. to form a homopolymer of butadiene having an average molecular weight of about 1300. To the cold solution of the reactive polybutadiene there was added slowly with stirring 13.81 ml. of epichlorohydrin. This was followed by the addition of ethylene oxide until the red color of the mixture was gone. The solution was acidified with 70 ml. of aqueous concentrated hydrochloric acid solution and was filtered. The product was recovered by evaporating the filtrate to dryness. There was obtained 304 grams of product as a viscous yellow resin having a hydroxyl number of 52. The product was a polymeric polyol having a molecular weight of about 2700. It is useful as the starting material for making polyesters and polyurethane resins.

Example 7

A feed mixture of 140 ml. of freshly distilled styrene and 611 ml. of tetrahydrofuran as solvent and reaction medium was polymerized by placing 450 ml. of a 0.910 normal catalyst solution of a sodium-potassium alpha-methyl styrene addition compound in tetrahydrofuran, prepared by procedure similar to that described in part A of Example 1, in a glass reaction vessel filled with nitrogen gas and equipped with a stirrer, stirring and cooling the catalyst solution to a temperature of −78° C. and adding the styrene feed mixture thereto slowly over a period of 65 minutes. The styrene was polymerized to a homopolymer having an average molecular weight of about 1100. To the cold solution of the reactive polystyrene there was added slowly with stirring 14.34 grams of vinyl cyclohexene dioxide of the formula

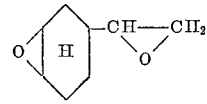

This was followed by adding ethylene oxide until the red color of the reaction mixture disappeared. A charge of 100 ml. of an aqueous concentrated hydrochloric acid solution was added and the mixture was allowed to warm up to room temperature. It was filtered to remove insoluble material. The filtrate was washed with water and the organic and aqueous layers separated. The organic layer was evaporated to dryness in a vacuum oven. The product was obtained as a white powder having a hydroxyl number of 90, and a molecular weight of approximately 2300.

Example 8

A feed mixture of 150 ml. of styrene and 72 ml. of butadiene dissolved in 528 ml. of tetrahydrofuran was polymerized in admixture with 300 ml. of tetrahydrofuran containing 122 ml. of a 0.989 normal catalyst solution of a sodium-potassium alpha-methyl styrene addition compound in tetrahydrofuran, prepared by procedure similar to that described in part A of Example 1, by adding the feed mixture of monomers and solvent to the catalyst solution slowly over a period of 80 minutes while maintaining the resulting mixture at a temperature of 0° C. The styrene and butadiene were polymerized to a copolymer having an average molecular weight of about 3800. To the cold solution of the reactive copolymer there was added 2.44 grams of butadiene dioxide with stirring over a period of about 15 minutes, after which ethylene oxide was added until the red color of the mixture disappeared. A charge of 100 ml. of tetrahydrofuran saturated with gaseous hydrochloric acid was added followed by the addition of 2 ml. of water. The solution was filtered to remove insoluble material. The filtrate was washed with water and the aqueous and organic layers were separated. The organic layer was evaporated to dryness. The polymer product was a white powder having a hydroxyl number of 29 and a molecular weight of approximately 7700.

Example 9

A charge of 200 ml. of tetrahydrofuran was placed in a glass reaction vessel filled with nitrogen gas and equipped with a reflux condenser and stirrer. It was stirred and a 0.882 normal solution of a sodium-potassium alpha-methyl styrene addition compound in tetrahydrofuran was added until the solution was a faint red color. Then, 149 ml. more of the 0.882 normal solution was added as catalyst. The solution was stirred and cooled to —78° C. after which a feed mixture consisting of 250 ml. of butadiene dissolved in 600 ml. of tetrahydrofuran was added over a period of 65 minutes while maintaining the resulting mixture at a reaction temperature of —78° C. The butadiene was polymerized to a homopolymer having an average molecular weight of about 3000. To the cold solution of the reactive polybutadiene there was added 7.2 grams of resorcinol diglycidyl ether over a period of 15 min. with stirring. Thereafter, ethylene oxide was added until the red color of the reaction mixture disappeared. The mixture was allowed to warm up to room temperature, then was mixed with 160 ml. of tetrahydrofuran saturated with gaseous hydrochloric acid, and 12 ml. of water. The resulting mixture was filtered, was washed with water and the product recovered by evaporating the solvent under vacuum. The polymeric product was a viscous pale lemon colored resin having a hydroxyl number of 54 and a molecular weight of approximately 6200.

*Example 10*

Butadiene was polymerized in tetrahydrofuran as solvent and reaction medium in the presence of 254 ml. of a 0.91 normal catalyst solution of a sodium-potassium alpha-methyl styrene addition compound in tetrahydrofuran, prepared by procedure similar to that described in Example 1, by procedure similar to that employed in Example 9, except that the polymerization reaction was carried out at a temperature of —50° C. The polybutadiene had an average molecular weight of about 1900. To the cold solution of the reactive polybutadiene there was added with stirring 14.2 grams of dipropylene glycol diglycidyl ether over a period of about 15 minutes. This was followed by the addition of ethylene oxide until the red color of the reaction mixture disappeared. A charge of 125 ml. of tetrahydrofuran saturated with gaseous hydrogen chloride was added, followed by 5 ml. of water. The solution was filtered to remove insoluble material, then was washed and the solvent evaporated under vacuum. The polymeric product is a viscous pale yellow resin having a hydroxyl number of 55, and a molecular weight of approximately 4100. The product is useful as the starting material for making polyester and polyurethane resins.

*Example 11*

A charge of 40 grams of the polymeric polyol product prepared in Example 1 was blended with 32 grams of polypropylene glycol (having an average molecular weight of 2000), 24 ml. of toluene, 7 grams of a glycerol-propylene oxide adduct having 7.31 percent OH and 9.84 ml. of para-toluene diisocyanate, and the mixture heated at a temperature of 130° C. for a period of 16 hours. Then 18.64 ml. more of toluene diisocyanate were added and the resulting mixture heated at a temperature of 130° C. for 21 hours longer. The reaction product had a NCO content of 6.5 percent by weight. Ten grams of the reaction product were mixed with 0.005 ml. of silicone oil, 0.20 ml. of N-methyl-morpholine, 0.1775 ml. of toluene diisocyanate and 0.236 ml. of water. The mixture foamed to form a rigid cellular product composed of small uniform cells and having a density of 3 pounds per cubic foot of the foam.

*Example 12*

A charge of 50 grams of the polymeric product prepared in Example 3 was placed in a reaction vessel and was mixed with 4.11 ml. of toluene diisocyanate. The mixture was heated at a temperature of 130° C. for a period of 16.5 hours. The product was a tough rubbery polyurethane resin and was insoluble in organic solvents.

*Example 13*

A charge of 20 grams of a polymeric product derived from a copolymer of 75 percent by weight of butadiene and 25 percent of styrene, prepared by procedure similar to that employed in Example 6, and having a hydroxyl number of 57 was mixed with one gram of maleic anhydride. The mixture was heated for 2 hours at a temperature of 150° C. The product was a polyester. A portion of the product was dissolved in an equal weight of tetrahydrofuran. The solution was coated as a layer onto a tin-plated sheet of iron and was dried and heated at a temperature of 150° C. for a period of 2 hours. The baked film was flexible and was insoluble in xylene.

I claim:

1. A method for making a polymeric polyol which comprises polymerizing an ethylenically unsaturated hydrocarbon monomer having conjugated unsaturation, at least one of said double bonds being between carbon atoms in an aliphatic portion of said monomer, in an ether solvent and reaction medium, in admixture with an alkali metal addition compound of alpha-methyl styrene as polymerization catalyst, at temperatures between about —80° and +30° C., reacting the thus-formed hydrocarbon polymer in the ether solvent in which it is prepared with a polyfunctional epoxy-containing coupling agent having at least one epoxy group in the molecule, in amount corresponding to from about 0.25 to 0.75 chemically equivalent proportion of the polyfunctional coupling agent per gram molecular proportion of the hydrocarbon polymer, whereby at least a portion of the hydrocarbon polymer molecules are chemically combined into polymer molecules of larger size, then reacting the thus-formed polymeric material with a monofunctional monoepoxide.

2. A method according to claim 1, wherein the hydrocarbon monomer is an alkenyl aromatic hydrocarbon.

3. A method according to claim 2, wherein the alkenyl aromatic hydrocarbon monomer is styrene.

4. A method according to claim 1, wherein the hydrocarbon monomer is an aliphatic conjugated diolefin.

5. A method according to claim 4, wherein the aliphatic hydrocarbon monomer is butadiene.

6. A method according to claim 1, wherein the hydrocarbon monomer is a mixture of butadiene and styrene.

7. A method according to claim 1, wherein the polyfunctional epoxy-containing coupling agent is epichlorohydrin.

8. A method according to claim 1, wherein the polyfunctional epoxy-containing coupling agent is a polyglycidyl ether of a polyhydric phenol.

9. A method according to claim 1, wherein the polyfunctional epoxy-containing coupling agent is a polyglycidyl ether of a glycol.

10. A polymeric polyol containing a plurality of hydroxyl groups and obtained by polymerizing an ethylenically unsaturated hydrocarbon monomer having conjugated unsaturation, at least one of said double bonds being between carbon atoms in an aliphatic portion of said monomer, in an ether solvent and reaction medium, in admixture with an alkali metal addition compound of alpha-methyl styrene, as polymerization catalyst, at temperatures between about —80° and +30° C., reacting the thus-formed hydrocarbon polymer in the ether solvent in which it is prepared with a polyfunctional epoxy-containing coupling agent having at least one epoxy group in the molecule, in amount corresponding to from about 0.25 to 0.75 chemically equivalent proportion of the polyfunctional coupling agent per gram molecular proportion of the hydrocarbon polymer, whereby at least a portion of the hydrocarbon polymer molecules are chemically combined into polymer molecules of larger size, then reacting the thus-formed polymeric material with a monofunctional monoepoxide.

11. A polymeric polyol according to claim 10 wherein the polymerized hydrocarbon is an alkenyl aromatic hydrocarbon.

12. A polymeric polyol according to claim 11 wherein the polymerized hydrocarbon monomer is styrene.

13. A polymeric polyol according to claim 10 wherein the polymerized hydrocarbon is an aliphatic conjugated diolefin.

14. A polymeric polyol according to claim 13 wherein the polymerized hydrocarbon monomer is butadiene.

15. A polymeric polyol according to claim 10 wherein the polymerized hydrocarbon monomer is a copolymer of butadiene, and alpha-methyl styrene.

16. A polymeric polyol according to claim 10 wherein the polyfunctional epoxy-containing coupling agent is epichlorohydrin.

17. A polymeric polyol according to claim 10 wherein the polyfunctional epoxy-containing coupling agent is butadiene dioxide.

18. A polymeric polyol according to claim 10 wherein the polyfunctional epoxy-containing coupling agent is a polyglycidyl ether of a polyhydric phenol.

19. A polymeric polyol according to claim 10 wherein the polyfunctional epoxy-containing coupling agent is a polyglycidyl ether of a glycol.

20. A polymeric polyol according to claim 10 wherein the polyfunctional epoxy-containing coupling agent is cyclohexene dioxide.

References Cited in the file of this patent

UNITED STATES PATENTS

| | | |
|---|---|---|
| 2,559,947 | Crouch | July 10, 1951 |
| 2,947,338 | Reid et al. | Aug. 2, 1960 |
| 3,029,221 | Welch | Apr. 10, 1962 |

FOREIGN PATENTS

| | | |
|---|---|---|
| 817,693 | Great Britain | Aug. 6, 1959 |